United States Patent

Edwards et al.

[11] Patent Number: 5,752,363
[45] Date of Patent: May 19, 1998

[54] METHOD AND APPARATUS FOR MANUFACTURING LIQUID DISPENSERS

[76] Inventors: William R. Edwards, 6240 Los Altos Dr., El Paso, Tex. 79912; Paul K. Frederick, 7 Ciele Del Este, Anthony, N. Mex. 88021

[21] Appl. No.: 837,652

[22] Filed: Apr. 22, 1997

[51] Int. Cl.$^6$ .................................................. B65B 61/00
[52] U.S. Cl. .......................... 53/410; 53/471; 53/133.2; 53/142; 53/173; 53/DIG. 2; 206/222; 206/229; 141/22
[58] Field of Search ............................. 222/401, 541, 222/541.9; 141/222, 229, 440; 422/102, 104; 206/229, 440, 222; 53/453, 559, 410, 449, 471, 133.1, 133.2, 142, 173, 236, 282, 284.6, DIG. 2

[56] References Cited

U.S. PATENT DOCUMENTS

| | | | |
|---|---|---|---|
| 4,956,962 | 9/1990 | Williams | 53/453 |
| 4,963,045 | 10/1990 | Willcox | 206/440 |
| 5,025,123 | 6/1991 | Pfaffman et al. | 53/DIG. 2 |
| 5,117,613 | 6/1992 | Pfaffman | 53/DIG. 2 |
| 5,205,110 | 4/1993 | Buchko | 53/453 |
| 5,538,353 | 7/1996 | DeHavilland | |
| 5,682,729 | 11/1997 | Buchko | 53/453 |

*Primary Examiner*—W. Donald Bray
*Assistant Examiner*—John Paradiso
*Attorney, Agent, or Firm*—Shook, Hardy & Bacon L.L.P.

[57] ABSTRACT

A method is provided for manufacturing liquid dispensers of the general type having a body 10 presenting a pocket 16, a glass ampule 12 received in the body and enclosing a liquid to be dispensed, and a porous element 14 covering the pocket of the body. The method includes arranging a plurality of bodies 10 in a row, bottom ends up, on a tray, and placing ampules 12 in the pockets 16. A strip 72 of porous material is aligned over the pockets of the bodies and secured in place. Thereafter, the strip is cross cut into individual elements to complete the manufacture of the liquid dispensers. The securing step is preferably carried out by ultrasonically welding the porous material to the bodies so that it is not necessary to use adhesives. The cross-cutting step is preferably carried out by pressing a heated wire through the strip of porous material at a position intermediate each pair of adjacent bodies. An apparatus for carrying out manufacture of the dispensers is also provided.

13 Claims, 3 Drawing Sheets

# METHOD AND APPARATUS FOR MANUFACTURING LIQUID DISPENSERS

BACKGROUND OF THE INVENTION

The present invention relates generally to the manufacture of liquid dispensers, and more particularly to a method and apparatus for manufacturing liquid dispensers of the type including fracturable glass ampules within which liquid is stored prior to being dispensed.

A liquid dispenser is illustrated in U.S. Pat. No. 5,538,353 (the '353 patent), to DeHavilland, which is assigned of record to Medi-Flex Hospital Products, Inc. The disclosure of the '353 patent is incorporated into this application by this express reference, and shows a liquid dispenser including a closed, liquid-filled vial or ampule formed of fracturable material, a body having a pocket shaped for receipt of the ampule, and a porous element sealed to the body and closing off the open side of the pocket so that liquid flows through the element when the ampule is fractured. The body has a flange surrounding the pocket, and a pair of upstanding gripping members or wings are supported on the flange for relative pivoting movement toward and away from one another. Tabs are formed between the wings and the pocket so that when the wings are moved together, the tabs exert a fracturing force on the ampule to release the liquid.

It is known to manufacture dispensers such as that shown in the '353 patent by cutting individual porous elements from a web of porous material, and then securing each element over the pocket of a dispenser body with an ampule placed in the pocket. As discussed in the '353 patent, as an alternative to using an adhesive, it is also possible to secure the porous element to the body by stitching, heat sealing, or chemical bonding steps.

Typically, the individual porous elements are cut from the web by first cutting the web into longitudinal strips through the use of an interference-type longitudinal slitting assembly. Thereafter, the strips are cross-cut with a conventional die cutting assembly. A drawback to the use of this method is that these types of cutting mechanisms require significant maintenance due to the use of sharp cutting elements that dull with time and require sharpening. As the cutting assemblies operate with dull blades or dies, the edges formed in the manufactured porous elements become deformed. As such, the appearance of the porous elements, and of the completed dispensers, is unattractive.

Another problem with the conventional manufacturing method arises due to the safety concerns surrounding the use of adhesives in the manufacture of dispensers. This concern is due primarily to the existence in most adhesives of solvents that present potential health risks, and both OSHA and the EPA require that specific precautions be taken in the use of such materials.

SUMMARY OF THE INVENTION

It is an object of the present invention to provide a method of manufacturing liquid dispensers that does not require the use of adhesives or other potentially harmful chemicals such that resulting dispensers are safe to manufacture. It is another object to provide a method of manufacturing dispensers that includes forming individual porous elements from a web of porous material without using expensive, high-maintenance interference cutting or die-cutting assemblies. As such, the cost of producing the porous elements can be reduced while the quality and appearance of the elements is improved.

In accordance with these and other objects evident from the following description of a preferred embodiment of the invention, a method is provided for manufacturing a liquid dispenser of the type having a body presenting an open pocket, an ampule received in the pocket and enclosing a liquid to be dispensed, and a porous element covering the pocket. The method includes the steps of placing a glass ampule in the pocket of the body, placing the porous element over the pocket, enclosing the ampule within the pocket, and securing the porous element over the pocket by ultrasonically welding the unfoamed laminate of the porous element to the body.

Preferably, a plurality of bodies are arranged on a tray in a row, with the pockets facing upward, and an ampule is placed in the pocket of each body in the row before a strip of porous material is placed over the pockets. Thereafter, the strip of porous material is secured to the bodies in the row by ultrasonically welding the unfoamed laminate of the strip to the bodies, and is cut into individual porous elements. When this step is employed, the cutting step includes pressing a laterally extending heated wire through the strip of porous material at a position intermediate each pair of adjacent bodies in the row so that a cross cut through the strip is obtained.

By providing a method in accordance with the present invention, numerous advantages are realized. For example, by using heated wires to cut and shape the strips into individual elements, a method results by which the porous elements produced have a consistently attractive appearance that dresses up the overall look of the completed dispensers relative to similar dispensers manufactured with conventional methods. In addition, by employing an ultrasonic welding step to secure the strips of porous material to the bodies, it is not necessary to use adhesives that would impact the safety of the manufacturing process.

BRIEF DESCRIPTION OF THE DRAWING

The preferred embodiment of the present invention is described in detail below with reference to the attached drawing figures, wherein.

DETAILED DESCRIPTION OF THE PREFERRED EMBODIMENT

Figure 8:
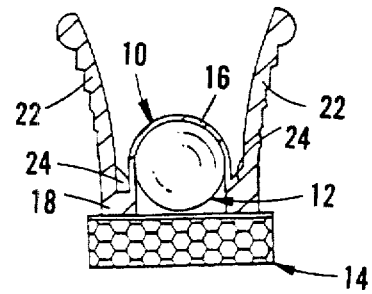
FIG. 8 is a sectional view through the liquid dispenser, illustrating a body, a glass ampule, and a porous element forming the dispenser.
Figure 9:
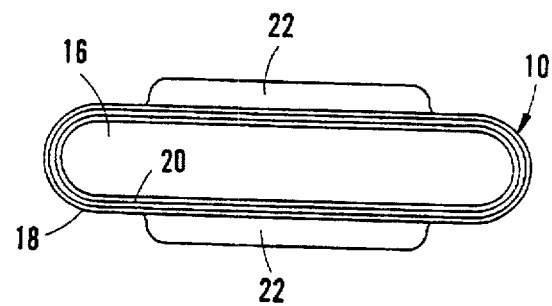
FIG. 9 is a bottom plan view of the body of the dispenser, illustrating a pocket at the bottom end of the body and a ridge formed in the body around the pocket.

For exemplary purposes, the method and apparatus of the preferred embodiment of the present invention are discussed in connection with the manufacture of liquid dispensers of the type shown in FIGS. 7-9, and as generally described in the '353 patent. Turning to FIG. 8, the dispenser includes a body 10, a closed, liquid-filled glass ampule 12 received in the body, and a porous element 14 secured to the body and enclosing the ampule so that liquid flows through the element when the ampule is fractured.

The glass ampule 12 can be used for containing various liquids such as antiseptics or medicaments, chemical compositions, cleansing agents, cosmetics, polishes or the like. The body 10 is formed of a high density polyethylene although any material exhibiting similar flexibility and integrity may be used, and includes an open-sided pocket 16 within which the ampule 12 is received and a flange 18 protruding from the pocket along the open bottom side. As shown in FIG. 9, the flange 18 presents a generally planer bottom surface adapted to receive the porous element, and a ridge 20 protrudes from the bottom surface around the pocket opening. The ridge 20 provides material at the interface between the body 10 and the porous element 14 that is melted during an ultrasonic welding step of the preferred manufacturing method, facilitating adherence of the porous element to the body.

Figure 7:
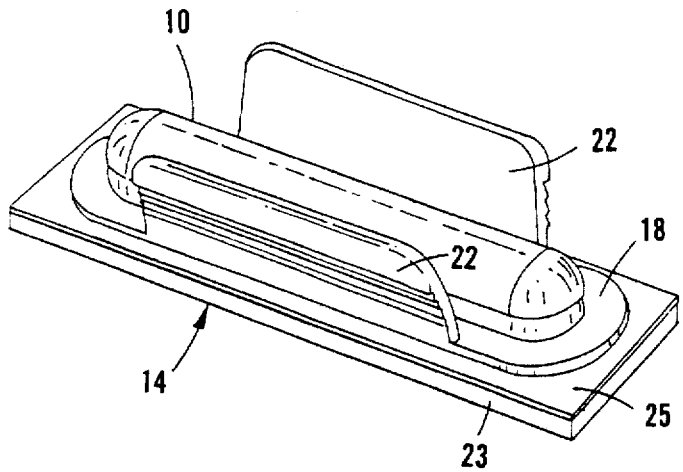
FIG. 7 is a perspective view of a liquid dispenser manufactured in accordance with the preferred embodiment.

As illustrated in FIG. 7, the body also includes a pair of opposed gripping members or wings 22 projecting from the flange 18. The members 22 extend along the length of the pocket and are spaced laterally from the pocket to leave room for three tabs 24, shown in FIG. 8. These tabs 24 interconnect the flange 18, the gripping members 22 and the pocket 16, and flex the pocket inwardly when the gripping members are pivoted toward one another by the user, fracturing the ampule 12 to release the liquid for dispensing. The porous element 14 is secured to the body over the open side of the pocket 16 and encloses the ampule within the pocket so that liquid flows from the pocket through the element when the ampule is fractured.

Figure 10:
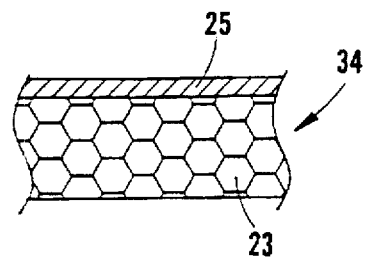
FIG. 10 is a fragmentary sectional view of a web of porous material that is used in the manufacture of the liquid dispensers.

The porous element 14 is formed of any suitable porous material, such as an open-celled synthetic resin foam. An exemplary material is illustrated in FIG. 10, and includes a 100 pore polyurethane foam 23 having a fabric laminate 25 of polyethylene or the like on the inner surface of the element facing the body. Returning to FIG. 7, the fabric laminate 25 serves three functions in the applicator. In the finished product, the laminate prevents any shards of glass from the fractured ampule from pushing through the foam element during use. In addition, the fabric laminate 25 provides structural support to the body, preventing the opposing lateral sides of the pocket 16 from pulling apart from one another during actuation of the gripping members 22.

In order to provide this last mentioned function, it is necessary to orient the porous element 14 with the machine direction or longitudinal axis of the fabric material transverse to the longitudinal axis of the pocket 16. In the manufacture of the fabric laminate, the machine direction is defined as the direction parallel to which the fabric is resistant to stretching. Thus, by orienting the fabric laminate of the porous element transverse to the length of the body, the fabric resists stretching across the body, preventing the body from pulling open at the pocket upon actuation of the gripping members. With this structural support of the pocket, minimal effort is required to fracture the ampule.

During manufacture of the applicator, the fabric laminate serves the additional function of presenting material at the interface between the body and the porous element that is melted during ultrasonic welding, facilitating adherence of the porous element to the body. As such, inclusion of the fabric laminate on the porous element 14 facilitates manufacturability of the applicator.

Figure 1:
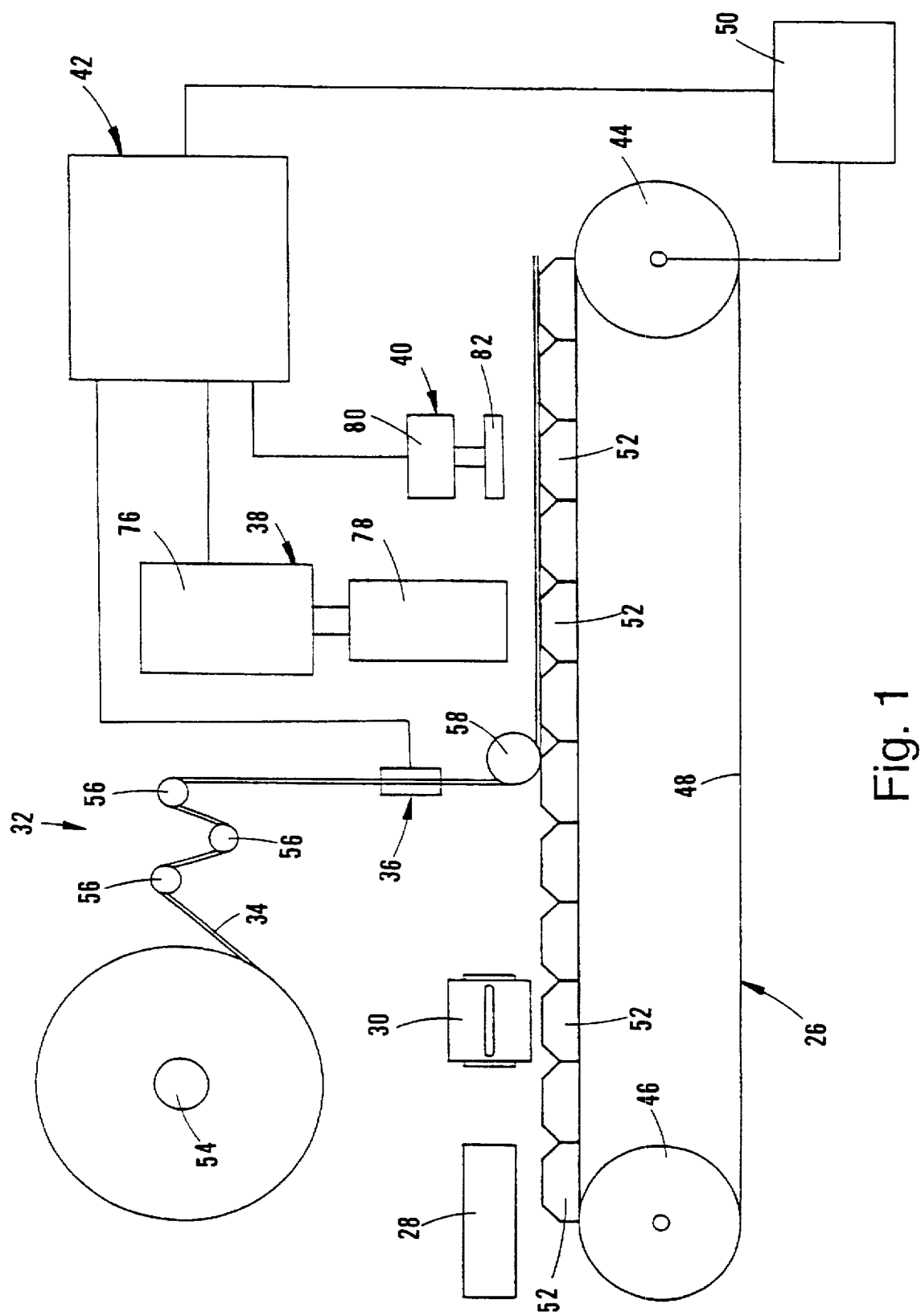
FIG. 1 is a side elevational view of an apparatus constructed in accordance with the preferred embodiment.

An apparatus for manufacturing liquid dispensers in accordance with the preferred embodiment of the present invention is shown in FIG. 1, and broadly includes an indexing conveyor 26, a body dispenser 28, an ampule dispenser 30, a web handling assembly 32 for handling a web 34 of porous material, a slitting assembly 36, an ultrasonic welder 38, a hot wire cross-cutting assembly 40, and a controller 42.

The indexing conveyor 26 includes a drive roller 44, an idler roller 46, a conveyor belt 48 trained around the rollers 44, 46, and an indexing mechanism 50 for intermittently rotating the drive roller a predetermined degree to longitudinally step the conveyor belt in fixed increments. A plurality of trays 52 are secured to and carried by the belt, and move with the belt around the rollers and along the upper and lower runs defined by the belt. Although only a small number of trays are shown in FIG. 1, it is understood that the trays extend along both runs of the belt. Each tray 52 includes a plurality of cavities, each sized for receipt of a dispenser body in an upturned, bottom-end-up orientation. The cavities are arranged to accommodate a pair of longitudinally extending rows of dispenser bodies, and each row includes three cavities. However, other embodiments are possible. As such, the gripping members and the wall of the pocket of each body are supported in each cavity of the tray, while the open bottom side of the pocket is oriented upward. Although the preferred tray is of a two-by-three construction, other sizes may also be employed.

The body dispenser 28 is positioned above the conveyor at the upstream or left-hand end of the conveyor, as shown in FIG. 1, and dispenses six bodies, bottom ends up, to each tray on the conveyor after the tray is stepped into position beneath the dispenser and stopped. Likewise, the ampule dispenser 30 is positioned over the conveyor to deposit liquid-filled glass ampules into the exposed pockets of the bodies in each tray after the tray is stepped into position beneath the dispenser 30. The ampule dispenser is spaced longitudinally from the body dispenser 28 by a distance equal to a multiple of the length of a tray so that each time the conveyor is stopped, both body dispensing and ampule dispensing steps are carried out on different, spaced trays.

The web 34 of porous material is used to form the individual porous elements of the liquid dispensers manufactured by the preferred method and apparatus, and the web handling assembly 32 supports the web during travel through the slitting assembly 36 and into the ultrasonic welder 38. The web handling assembly 32 includes a reel 54 for supporting the web, tension rollers 56 for guiding the web from the reel without tension, and a guide roller 58 adjacent the trays of the conveyor for laying the web against the trays prior to welding. Feeding of the web is achieved by the conveyor 26, which pulls the web 34 along by the weld between the web and the bodies disposed beneath the welder, drawing web material from the reel and through the slitting assembly 36.

Figure 2:
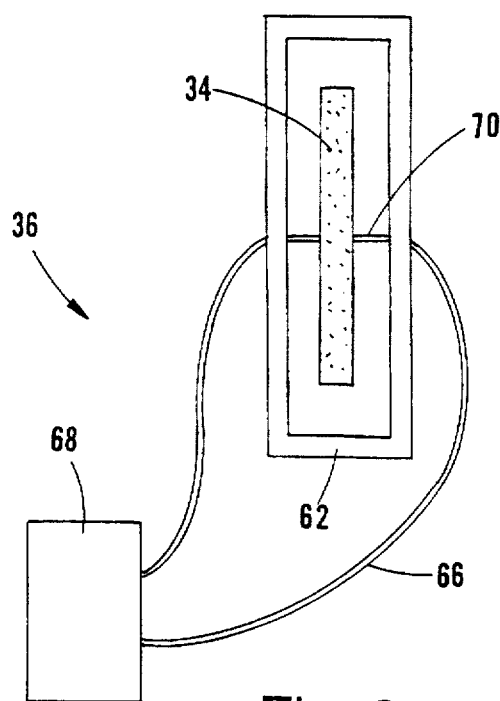
FIG. 2 is a top plan view of a slitting assembly forming a part of the apparatus.

As shown in FIG. 2, the hot wire slitting assembly 36 includes a housing 62 having a pair of longitudinally spaced side walls presenting an open vertical passage 64, a conductor 66 threaded through the side walls across the passage, and a power supply 68 for supplying current to the conductor 66. The housing is supported over the conveyor at a position intermediate the ampule dispenser 30 and the welder 38, and between the tension rollers 56 and the guide roller 58. The side walls of the housing are spaced from one another by a distance sufficient to receive the web 34.

Figure 3:
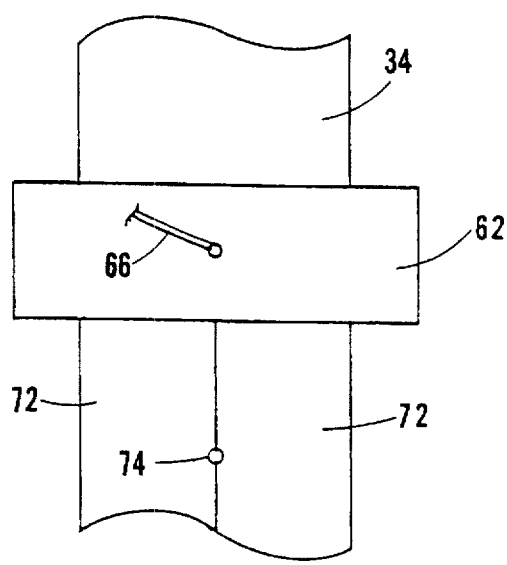
FIG. 3 is a end elevational view of the slitting assembly.

The conductor 66 is insulated along the length thereof that extends outside of the housing, but is exposed within the housing along the length of a centrally disposed slitting element 70 defined by the conductor. In addition, the material and diameter of the conductor is such that the element becomes hot when current is carried by the conductor. As such, the element 70 is able to melt the material of the web as the web is fed incrementally through the housing, slitting the web into a pair of side-by-side strips 72 as shown in FIG. 3. Preferably, the power supply remains on continuously even though the web is advanced incrementally, resulting in the formation of holes 74 in the web along the lengths of the slits. A sensing circuit is preferably provided for sensing a prolonged condition of non-movement of the web, e.g. of more than about 3 seconds, and for shutting off the power supply when the condition is sensed. As such, the slitting element does not ignite the web material.

Figure 4:
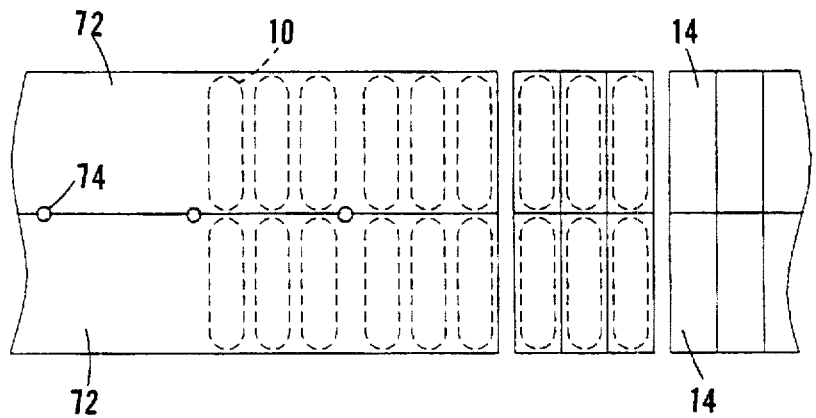
FIG. 4 is a top plan view of a web of porous material, illustrating the various processing steps carried out on the web during travel of the web through the apparatus.

The width of the strips 72 formed by the slitting assembly 36 corresponds to the length of the bodies being manufactured, and the guide roller helps to align the strips with the bodies carried in the trays of the conveyor as the trays are indexed toward the welder. As shown in FIG. 4, the slitting assembly 36 is spaced from the welder 38 by a distance equal to a multiple of the length of the trays so that the holes 74 formed in the web by the slitting elements are aligned with the longitudinal spaces between the trays. As such, the material of the web including the holes is removed from the dispensers during the cross-cutting step.

An advantage is obtained by the use of the preferred slitting assembly in that the strips 72 of porous material tend to stick together along the slits as the web is indexed through the assembly. This sticking occurs as the hot porous material cools after slitting, adhering to the material across from it. Thus, although the web is slit into parallel strips prior to the welding step, the strips tend to remain together as a web as they are guided over the trays on the conveyor. The resulting lines of weakness defined by the slits allow the dispensers to be easily separated from one another subsequent to cross-cutting.

The welder 38 is shown in FIG. 1, and includes a housing 76 that is supported at a fixed height above the conveyor, and a horn 78 that is supported beneath the housing for reciprocating, vertical movement between a raised position spaced from the dispensers on the conveyor, and a lowered position pressed against the dispensers. A mechanism is provided in the housing for raising and lowering the horn, and the controller 42 activates the mechanism, lowering the horn when the conveyor is stopped after an indexing movement, and raising the horn upon completion of welding. Preferably, in the lowered position of the horn 78, it presses the strips of web material against the bodies of the dispensers in the underlying tray with a force of 30–45 psi, and the welder is activated for 2–3 seconds to complete the welding operation. However, the pressure between the horn and the dispensers, as well as the time of welding, will vary depending on the materials used and the signal employed.

The horn 78 is constructed with interior cavities, and includes a lower surface that is knurled, presenting a large number of small pyramid-shaped protrusions that direct an ultrasonic signal into the dispensers for melting the ridges 20 of the bodies and the coating 25 of the web to weld the bodies and strips together. However, the ultrasonic energy is directed by the horn in such a way as to avoid fracturing the ampules that are resting in the pockets of the bodies during welding. The construction of the head of the welder forms no part of the present invention, and is constructed in accordance with principles known to those of skill in the art of designing such devices.

The cross-cutting assembly 40 includes a housing 80 that is supported at a fixed height above the conveyor, and a cutting head 82 that is supported beneath the housing for reciprocating, vertical movement between a raised position spaced from the dispensers on the conveyor, and a lowered position extending beneath the strips of web material. A mechanism is provided in the housing for raising and lowering the cutting head, and the controller 42 activates the mechanism, lowering and raising the cutting head after each stoppage of the conveyor.

Figure 6:
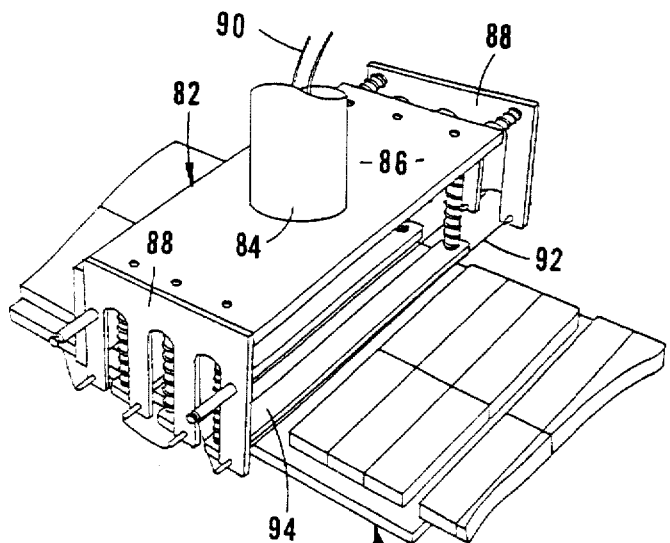
FIG. 6 is a perspective view of the cross-cutting assembly.

The cutting head is shown in FIG. 6, and includes a plunger 84, a top plate 86, and two side walls 88 depending from the opposed ends of the support plate. An electrical conductor 90 extends through the plunger, along the support plate, and through the legs, and presents four cutting elements 92 extending between the pair of legs across the width of the conveyor. The conductor 90 is covered or otherwise protected except for along the lengths of the cutting elements 92, and the material and diameter of the conductor is such that the elements 92 become hot when current is carried by the conductor. As such, the elements are able to melt the material of the web as the cutting head is pressed downward through the web during a cutting operation. Preferably, one of the side walls 88 is fixed to the top plate 86, and the other is supported on a pair of rods 100 for lateral shifting movement relative to the fixed side wall. Compression springs 102 are received on the rods 100 and seated between the top plate 86 and the side wall for biasing the side walls away from one another, tensioning the cutting elements 92.

Figure 5:
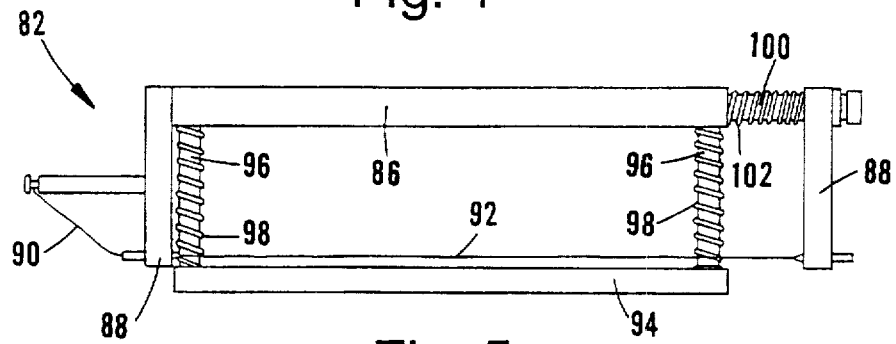
FIG. 5 is an end elevational view of a cross-cutting assembly forming a part of the apparatus.

As shown in FIG. 5, three compression bars 94 are suspended from the top plate 86 on axially shiftable rods 96 so that the bars can be shifted between an extended position in which the bars extend beneath the cutting elements, and a retracted position in which the bars retract above the elements. Compression springs 98 are received on each rod 96, and the springs seat against the top plate 86 and the compression bars 94 to bias the compression bars toward the extended position. However, when the cutting head is lowered against the bodies supported in one of the trays, the compression bars 94 bear against the foam material overlying the bodies, and compress the material. Further lowering of the cutting head 82 forces the bars to their retracted positions, allowing the cutting elements 92 to push past the compression bars and through the foam material. As such, the wires melt the material of the strips as the cutting head is lowered, and form individual elements of rectangular plan shape. The spacing between the trays on the conveyor is such that the length of the web including the holes 74 is cut from the strips during the cross-cutting step.

Returning to FIG. 1, the controller 42 is of conventional construction, including a PC or other processing unit that is capable of controlling operation and timing of the conveyor indexing mechanism 50, the power supply 68 of the slitting assembly 36, the welder 38, and the cross-cutting assembly 40. During operation, the controller 42 indexes the conveyor 26 to shift the trays longitudinally a distance equal to the length of one tray. Thereafter, six bodies are deposited on the tray sitting beneath the dispenser and six ampules are inserted in the pockets of the bodies sitting beneath the dispenser.

At the same time that bodies and ampules are deposited at the upstream end of the conveyor, the horn 78 of the welder 38 is lowered into pressing contact with the bodies sitting beneath the welder, and an ultrasonic signal is generated and transmitted through the horn, melting the coating of the web and the ridge of the bodies so that the strips are adhered to the bodies, closing off the pockets. The cross-cutting head 82 is also lowered and raised during stoppage of the conveyor to cross-cut the web to form individual porous elements, completing manufacture of the dispensers in the tray immediately downstream of the cross-cutting assembly. Of course, subsequent operations may also be carried out on the dispensers, such as printing, packaging or the like.

After a 2–3 second welding operation, the horn 78 is raised and the controller 42 actuates the indexing mechanism 50 to index the conveyor another tray length. During advancement of the conveyor, the web is drawn from the reel 54 and through the slitting assembly 36 such that the web is slit into strips. As such, slitting of the web is the only step carried out during movement of the conveyor. Alternately, it is possible to provide more complex constructions of the dispensers, the welder and/or the cross-cutting assembly to permit on-the-fly operation of the apparatus during movement of the conveyor.

Although the present invention has been described with reference to the preferred embodiment, it is noted that equivalents may be employed and substitution made herein without departing from the scope of the invention as recited in the claims.

What is claimed is:

1. A method of manufacturing a liquid dispenser having a body presenting a pocket, a glass ampule received in the pocket and enclosing a liquid to be dispensed, and a porous element covering the pocket, wherein the porous element includes an unfoamed laminate and the ampule is breakable to release the liquid to be dispensed through the porous element, the method comprising the steps of:

placing a glass ampule in the pocket of the body;
   placing the porous element over the pocket, enclosing the ampule within the pocket; and
   securing the porous element over the pocket by ultrasonically welding the unfoamed laminate of the porous element to the body.

2. A method as recited in claim 1, further comprising the steps of:

arranging a plurality of bodies on a tray in a row, with the pockets facing upward;
   placing an ampule in the pocket of each body in the row;
   aligning a strip of porous material over the pockets of the bodies in the row, with the strip extending in a direction transverse to the length of the row;
   securing the strip of porous material to the bodies in the row by ultrasonically welding the unfoamed laminate of the strip to the bodies; and thereafter
   cutting the strip of porous material into individual porous elements.

3. A method as recited in claim 2, wherein the securing and cutting steps are carried out simultaneously on separate longitudinally spaced trays of bodies, the method further comprising the step of intermittently advancing the trays after completion of the securing and cutting steps in order to sequentially perform the securing and cutting steps on the bodies of each tray.

4. A method as recited in claim 1, wherein the securing step includes pressing an ultrasonic welding head against the porous element and the body during ultrasonic welding.

5. A method as recited in claim 2, wherein the cutting step includes pressing a laterally extending heated wire through the strip of porous material at a position intermediate each pair of adjacent bodies in the row so that a cross cut through the strip is obtained.

6. A method of manufacturing a liquid dispenser having a body presenting a pocket, an ampule received in the pocket and enclosing a liquid to be dispensed, and a porous element covering the pocket, wherein the porous element includes an unfoamed laminate and the ampule is breakable to release the liquid to be dispensed through the porous element, the method comprising the steps of:

arranging a plurality of bodies in a row on a tray with the pockets facing upward;
   placing an ampule in the pocket of each body;
   placing a strip of porous material over the pockets of the bodies to enclose the ampules within the pockets;
   securing the strip of porous material to the bodies; and
   cutting the strip of porous material into individual porous elements by pressing a heated wire through the strip of porous material at a position intermediate each pair of adjacent bodies.

7. A method as recited in claim 6, wherein the securing and cutting steps are carried out simultaneously on separate longitudinally spaced trays of bodies, the method further comprising the step of intermittently advancing the trays after completion of the securing and cutting steps in order to sequentially perform the securing and cutting steps on the bodies of each tray.

8. A method of manufacturing a liquid dispenser having a body presenting a pocket, a glass ampule received in the pocket and enclosing a liquid to be dispensed, and a porous element covering the pocket, wherein the porous element includes an unfoamed laminate and the ampule is breakable to release the liquid to be dispensed through the porous element, the method comprising the steps of:

placing a glass ampule in the pocket of the body;
   feeding a web of porous material past a heated wire that extends through the web and splits the web into side-by-side longitudinal strips of a width corresponding to the width of the bodies;
   aligning the strips of porous material over the pockets of the bodies with the strips extending in a direction parallel to the length of the conveyor;
   securing the strips of porous material over the pockets of the bodies in each row; and
   cutting the strips of porous material that are secured to the bodies into individual porous elements.

9. A method as recited in claim 8, wherein the step of feeding a web of porous material past the heated wire includes using a web of open-celled foam material.

10. An apparatus for manufacturing a liquid dispenser having a body presenting a pocket, a glass ampule received in the pocket and enclosing a liquid to be dispensed, and a porous element covering the pocket, the porous element including an unfoamed laminate and the glass ampule being breakable to release the liquid to be dispensed through the porous element, the apparatus comprising:

a tray for supporting a plurality of the bodies in a row, with the pockets facing upward;
   a means for placing an ampule in the pocket of each body;
   a means for positioning a strip of porous material over the pockets of the bodies in the row;
   an ultrasonic welder for welding the unfoamed laminate of the strip of porous material to the bodies; and
   a cross-cutting means for cutting the strips of porous material that are welded to the bodies into a row of individual porous elements.

11. An apparatus as recited in claim 10, wherein the ultrasonic welder includes a horn, a means for moving the horn in and out of pressing contact against the row of bodies, and an ultrasound generating means for transmitting ultrasound through the horn when pressed against the bodies to secure the strips to the bodies without breaking the glass ampules.

12. An apparatus as recited in claim 10, wherein the cross-cutting means includes plurality of longitudinally spaced, laterally extending heated wires and a means for pressing the wires through the strip of porous material at positions intermediate each pair of adjacent bodies.

13. An apparatus as recited in claim 10, further comprising an indexing means for advancing the tray subsequent to each operation of the securing means and the cross-cutting means so that the strip of porous material is secured to the bodies and then cross-cut into individual porous elements.

* * * * *